(12) United States Patent
Donoghue

(10) Patent No.: US 6,384,823 B1
(45) Date of Patent: May 7, 2002

(54) SYSTEM AND METHOD FOR REAL-TIME MAPPING AND TRANSFER OF COORDINATE POSITION DATA FROM A VIRTUAL COMPUTER-AIDED DESIGN WORKSPACE TO THE REAL WORKSPACE

(76) Inventor: C. Michael Donoghue, 1519 Alameda Dr., Austin, TX (US) 78704-3101

( * ) Notice: Subject to any disclaimer, the term of this patent is extended or adjusted under 35 U.S.C. 154(b) by 0 days.

(21) Appl. No.: 09/225,810

(22) Filed: Jan. 5, 1999

(51) Int. Cl.[7] .............................................. G06T 11/40
(52) U.S. Cl. ...................................................... 345/425
(58) Field of Search ................................ 345/425, 418, 345/419, 427, 582; 382/154; 364/514, 522, 453; 356/376

(56) References Cited

U.S. PATENT DOCUMENTS

| | | | |
|---|---|---|---|
| 4,970,666 A | * 11/1990 | Welsh | ......................... 345/423 |
| 5,337,149 A | 8/1994 | Kozah et al. | ................. 356/376 |
| 5,440,492 A | 8/1995 | Kozah et al. | ................. 364/454 |
| 5,850,352 A | * 12/1998 | Moezzi et al. | ................. 345/514 |
| 5,857,032 A | * 1/1999 | Wang et al. | ................... 382/154 |
| 5,898,438 A | * 4/1999 | Stewart et al. | ............... 345/425 |
| 6,084,979 A | * 7/2000 | Kanade et al. | .............. 382/154 |
| 6,133,923 A | * 10/2000 | Ozawa | ......................... 345/430 |

* cited by examiner

Primary Examiner—Cliff N. Vo
Assistant Examiner—Huedung X. Cao
(74) Attorney, Agent, or Firm—Gray Cary Ware & Freidenrich, LLP (57) ABSTRACT

The system and method for real-time mapping and transfer of coordinate position data from a virtual CAD workspace to the real workspace comprises a computer containing a memory and a processor for storing and executing a mapping computer program. The mapping computer program receives coordinate position data, prompts a user to locate desired virtual points on the virtual computer model displayed on a computer display and map them to a corresponding point in the real workspace.

39 Claims, 7 Drawing Sheets

SYSTEM AND METHOD FOR REAL-TIME MAPPING AND TRANSFER OF COORDINATE POSITION DATA FROM A VIRTUAL COMPUTER-AIDED DESIGN WORKSPACE TO THE REAL WORKSPACE

TECHNICAL FIELD OF THE INVENTION

The present invention relates generally to the measuring, mapping, and transfer of data from virtual space to real space. In particular, this invention relates to a system and method for real-time mapping and transfer of coordinate position data from a virtual computer-aided-design (CAD) workspace to the real workspace.

BACKGROUND OF THE INVENTION

Constructing a building or parts of a building in the wrong location is a non-trivial problem. The process of properly positioning the physical layout of a structure in real space can be one of the most difficult and error prone phases of any construction project. As a result, an entire profession, construction surveying, has developed to resolve the problems regarding this issue.

Structural layout techniques developed and refined through the years have served the construction industry well, however, those techniques remain error prone and very time consuming. The errors and extensive time required to complete the layout process are generally due to inaccurate mapping and transfer of data from the construction documents to the actual construction workspace.

The individuals in charge of the layout process usually begins by making a series of offsets from known control points or "surveyed-in" points using traditional survey instruments and techniques. In general, the process is styled "Staking-out". On a typical project, there are literally hundreds of points that must be mapped, transferred, and verified in this fashion during all phases of construction. The process of mapping and transferring points from the construction documents to the construction workspace requires reading and interpreting a layout plan, interpreting the layout information and mapping location required with respect to the known control points, calculating the offsets, and locating the points in the work space through physical measurements. Studies of the construction environment have shown that measurement and plan reading and interpretation uses between six and eight percent of the man-hours on a project.

This process becomes even more difficult when one is trying to locate points which are not in the line of sight or completely occluded from the surveying equipment. The surveyor must move the survey equipment several times in order to make the accurate measurements of the that particular point. Conventional surveying techniques costs the construction industry a significant amount in terms of resources as well as worker productivity.

The construction industry would benefit from some means of shortening and simplifying the mapping and transfer of construction data involved in the basic layout of a structure. A means of directly transferring information from the construction document to the real workspace would be ideal. It would provide the workers in charge of layout a means of projecting the designed structure onto the real workspace with a minimal amount of calculation and interpretation.

SUMMARY OF THE INVENTION

The present invention provides a system and method for measuring, mapping, and transfer of data from virtual space to real space.

More specifically, the present invention provides a system and method for real-time mapping and transfer of coordinate position data directly from a virtual computer-aided-design (CAD) workspace to the real workspace. The system and method for real-time mapping and transfer of coordinate position data from a virtual CAD workspace to the real workspace comprises a computer containing a memory and a processor for storing and executing a mapping computer program. The mapping computer program receives coordinate position data, prompts a user to locate desired virtual points on the virtual computer model displayed on a computer display and map them to a corresponding point in the real workspace.

The present invention provides an important technical advantage by providing a system and method which eliminates time and man power needed to obtain numerous field calculations and measuring points in the real workspace in order to map and transfer data from virtual CAD space directly to the real workspace.

The present invention provides another important technical advantage by providing a system and method for obtaining the location of data points in the line of sight of a single instrument.

The present invention provides another important technical advantage by providing a system and method for real-time mapping of data points in three dimensional space from the virtual CAD workspace to the real workspace.

The present invention provides another important technical advantage by providing a system and method for mapping single points with an occluded view from the coordinate data acquisition device, but visible to a user in the line of sight of the measuring device.

The present invention provides another important technical advantage by providing a comprehensible virtual visual image of the real workspace to the layout person to aid in organizing the work.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES, like numerals being used to refer to like and corresponding parts of the various drawings.

The system and method for real-time mapping and transfer of coordinate position data from a virtual CAD workspace to the real workspace comprises a computer containing a memory and a processor for storing and executing a mapping computer program. The mapping computer program receives coordinate position data, prompts a user to locate desired virtual points on the virtual computer model displayed on a computer display and map them to a corresponding point in the real workspace.

Figure 1:
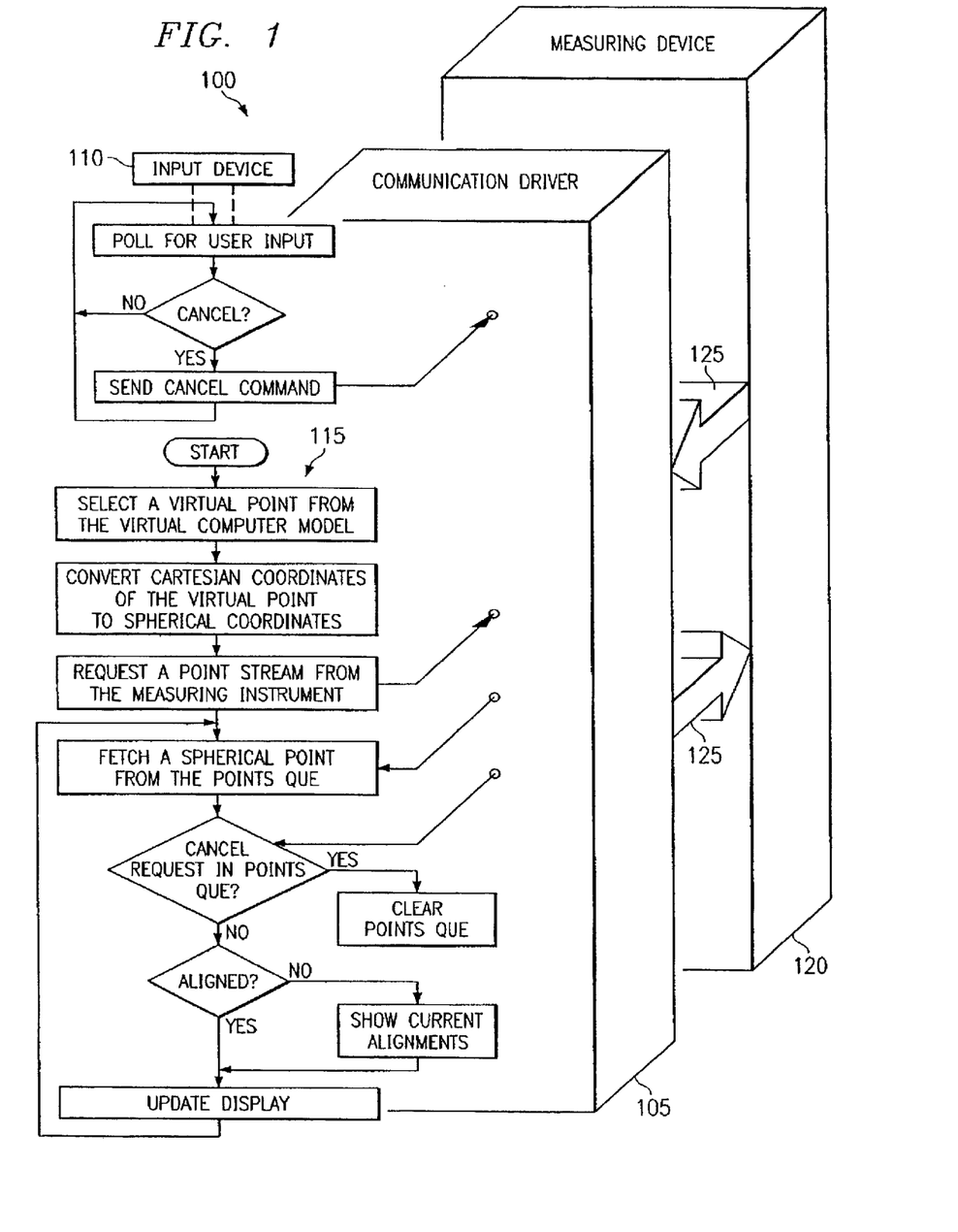
FIG. 1 shows one embodiment of a system for real-time mapping and transfer of coordinate position data from a virtual computer-aided-design workspace to the real workspace.

FIG. 1 shows one embodiment of the system for real-time mapping and transfer of data from the virtual CAD workspace to the real workspace 100. This first embodiment of the system for real-time mapping and transfer of coordinate position data from a virtual CAD workspace to the real workspace 100 comprises a computer 105, an input device 110, and a measuring device 120.

The computer 105 includes an input device 110, a viewing screen, a power supply, and standard internal components which are not shown in FIG. 1, but are all known in the art. The computer 105 could also include other input devices that are known in the art, but now shown. The computer 105 has sufficient capability to perform the computations required by this invention and supports a CAD computer program well known in the art and a mapping computer program 115. A block diagram depicting the functionality of the mapping computer program 115 is shown in FIG. 1.

The measuring device 120 is operable to send a visible laser marker to any point in the three dimensional real workspace, receive a reflection from the light beam, and then calculate the linear distance to the point. Other high frequency energy technologies besides the laser light beam may be used. A specific example of the measuring device, called a coordinate data acquisition device, can be found in U.S. Pat. No. 5,337,149 which is incorporated herein it its entirety by reference.

In FIG. 1, The CAD computer program provides a virtual workspace and the mapping computer program 115 drives the live real-time link between the virtual workspace located on the computer 105 and the measuring device 120 located in the real workspace. The mapping computer program 115 directs the computer 105 to continuously receive coordinate position data from the measuring device 120 in real-time. The mapping computer program uses the coordinate position data to continuously update the location of the measuring device's laser marker so it may be viewed real time in the CAD virtual workspace. It is also possible for the mapping computer program to retrieve coordinate position data directly from a CAD database. The functionality of the mapping computer program is explained in greater detail in FIG. 7.

Figure 2:
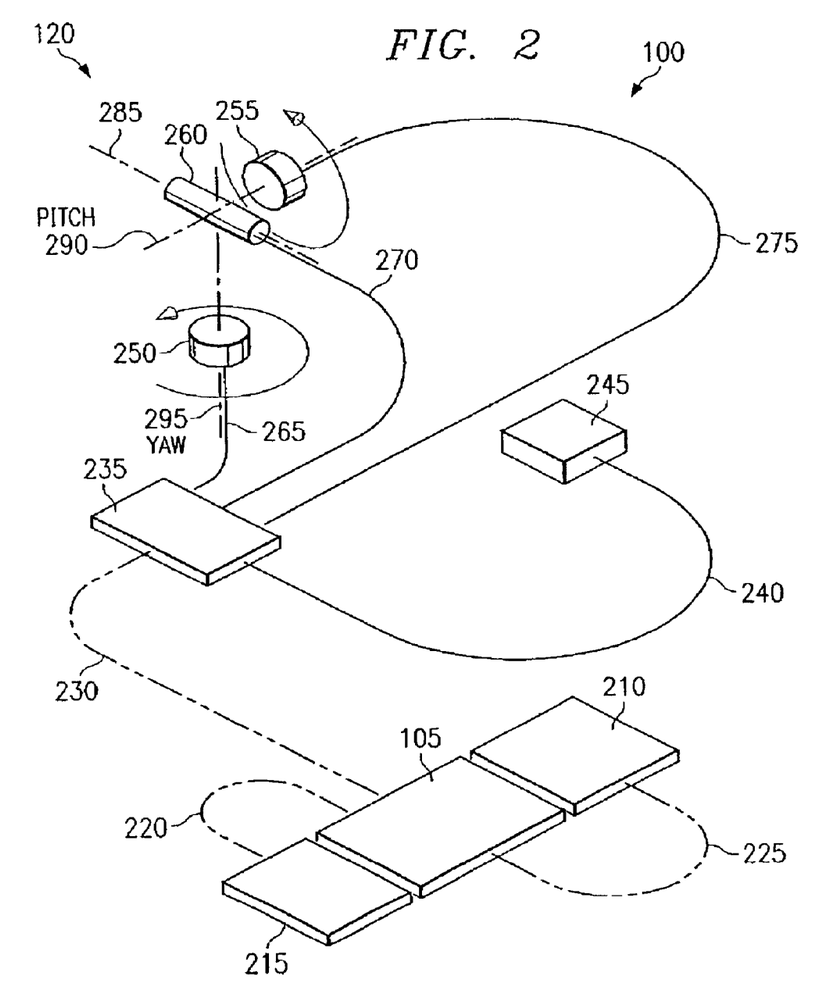
FIG. 2 shows another embodiment of a system for real-time mapping and transfer of coordinate position data from a virtual computer-aided-design workspace to the real workspace.

FIG. 2 shows another embodiment of the system for real-time mapping and transfer of data from the virtual CAD workspace to the real workspace 100. This embodiment of the system for real-time mapping and transfer of coordinate position data from a virtual CAD workspace to the real workspace 100 comprises a computer 105, a measuring device 120 and a microcontroller 235.

The computer 105 includes a viewing screen 210, a first power supply 215, and standard internal components that are not shown, but are all known in the art. The viewing screen 210 and the first power supply 215 are electrically connected to the computer 105 by connectors 225 and 220 respectively. The computer 105 could also include other input devices that are known in the art, but now shown. The computer 105 has sufficient capability to perform the computations required by this invention and supports a CAD computer program well known in the art and a mapping computer program 115. In this embodiment, computer 210 is a wearable variety, but desktop, palmtop, pentop, notebook or laptop, and other varieties could also be used.

The measuring device 120 is comprised of a first rotational sensor 250, a second rotational sensor 255, and an electronic distance measuring device (EDM) 260. The first and second rotational sensors, 250 and 255 respectively, could be optical encoders. The EDM 260 works by sending a visible laser light beam to any point in the three dimensional real workspace, receiving a reflection from the light beam, and then calculating the linear distance to the point. Other high frequency energy technologies besides the laser light beam may be used by the EDM to measure distances. The first and second rotational sensors, 250 and 255 respectively, monitor and measure the rotary attitudes of the EDM 260 as it rotates about the pitch axis 290 and the yaw axis 295. A specific example of the measuring device, called a coordinate data acquisition device, can be found in U.S. Pat. No. 5,337,149 which is incorporated herein in its entirety by reference.

The microcontroller 235 serves an information transfer device between the computer 105 and the measuring device 120. In this embodiment, the microcontroller is electrically connected to the computer by connection 230. The microcontroller 235 is also electrically connected to the first rotational sensor 250, the second rotational sensor 255, and the EDM 260 by connectors 265, 275, and 270 respectively. The microcontroller 235 can receive data from the first rotational sensor, the second rotational sensor and the EDM through connectors 265, 275, and 270 respectively, combine the coordinate position data in a data packet, and transmit the data packet through connector 230 to the computer 105. The microcontroller 235 may also receive a data packet from the computer 105 through connection 230, separate the data in the data packet, and transmit the separate coordinate position data to the first rotational sensor 250, the second rotational sensor 255, and the EDM 260 through connectors 265, 275, and 270 respectively. A second power supply 245 is electrically connected to and powers the microcontroller 235 through connector 240. Note that in another embodiment, the computer 105 could be connected to the microcontroller 235, the first rotational sensor 250, the second rotational sensor 255, and the EDM 260 by wireless interlink.

Figure 3:
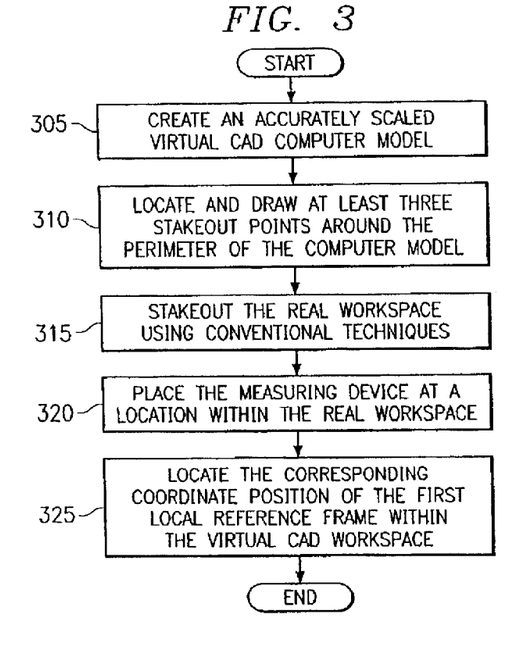
FIG. 3 shows a flow chart containing the steps for setting up the system for real-time mapping and transfer of coordinate position data from a virtual CAD workspace to the real workspace.
Figure 4:
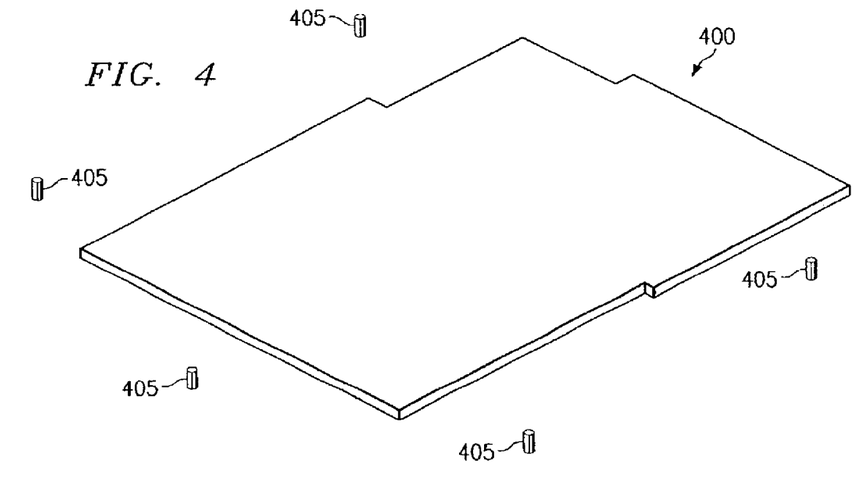
FIG. 4 shows a example of a virtual computer model.

FIG. 3 is a flow chart containing the steps for setting up the system for real-time mapping and transfer of coordinate position data from a virtual CAD workspace to the real workspace 100. First, the user should create an accurately scaled virtual computer model 400 of the actual real workspace using a CAD computer program in step 305. The CAD file may also be created with any computer application at any location producing a compatible file format. For example, this virtual computer model may be a concrete foundation for a house as shown in FIG. 4. The virtual computer model 400 can be two or three dimensional. Once the virtual computer model 400 is created, at least three or more virtual stakeout 405 points should be drawn in around the perimeter of the virtual computer model 400 with a known dimensional relation to the virtual computer model 400 in step 310. In step 315, the user should then stakeout the real workspace using conventional surveying techniques, including the stakeout points 405 identified in the virtual computer model 400. Additional stakeout or layout points may be positioned within the real workspace before or during the work to aid in repositioning the device.

Figure 5:
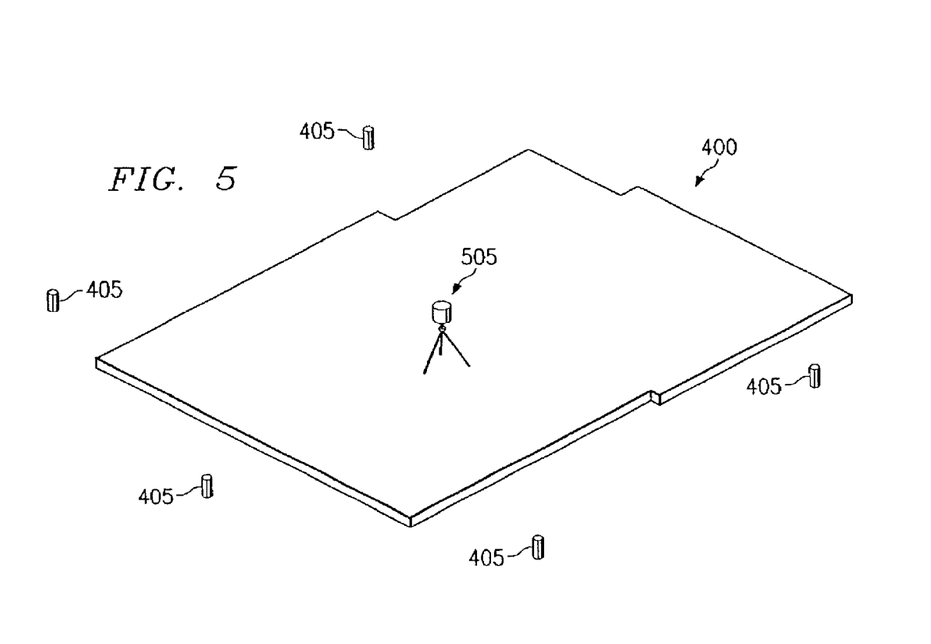
FIG. 5 shows a diagram of the virtual computer model with an icon of the virtual measuring device sitting in a corresponding local reference frame to the actual measuring device sitting in the real space.

After the conventional surveying is complete, the measuring device 120 should be placed at a location within the real workspace and initialized in step 320. This placement provides a first local reference frame of the measuring device 120 and establishes the origin and the zero reference angles on the pitch and yaw axes of the measuring device 120. Next, locate the corresponding coordinate position of the first local reference frame within the virtual CAD workspace in step 325. This is accomplished by first initializing the computer and loading the virtual computer model 400 of the real workspace. Next, start the mapping computer program 115. Using the measuring device, the user will sight or align on at least three of the stakeout or other known layout points 405 located in the real workspace at least one time each. The mapping computer program 115 will map and translate the coordinate position of the first local reference frame using techniques known in the art. It will then place an icon depicting a virtual measuring device 505 at a corresponding first local reference frame in the virtual CAD workspace as shown in FIG. 5. If the positioning of the virtual measuring device is within the virtual computer model 400 is acceptable, the set up phase is complete. Once the setup phase is complete, a user may now begin to map and transfer the coordinate position of virtual points located in the virtual CAD workspace to a corresponding position in the real workspace.

Figure 6:
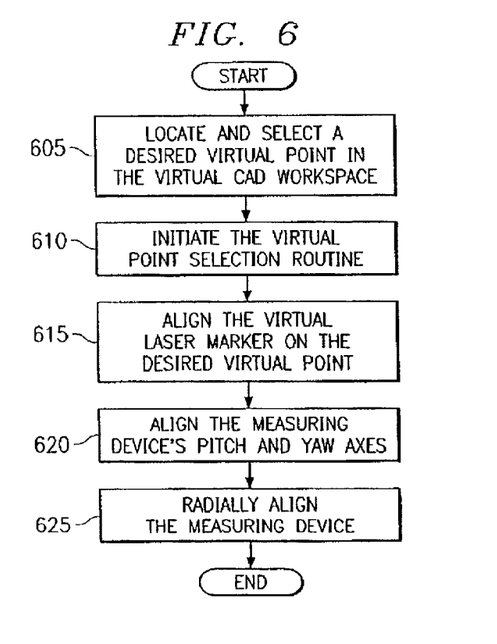
FIG. 6 shows a flow chart containing the steps for real-time mapping and translating of data from a virtual CAD workspace to the real workspace.

FIG. 6 shows a flow chart containing the steps for real-time mapping and translating of data from a virtual CAD workspace to the real workspace. First the user locates and selects a desired virtual point in the virtual CAD workspace and initiates the virtual point selection routine in steps 605 and 610, respectively. The user then moves or causes the measuring device 120 to move in the real workspace so that the virtual laser marker in the CAD workspace aligns on the desired virtual point in step 625. As the user moves the measuring device 120 in the real workspace, the mapping computer program 115 continuously receives coordinate position data from the measuring device 120. The mapping computer program 115 uses the coordinate position data to continuously update the location of the virtual laser marker in the virtual CAD workspace. The user proceeds in locating the selected point by aligning the measuring device's pitch and yaw axes if necessary in step 630. Alignment will be indicated by an alignment signal on the virtual laser marker line. Finally, radially align the measuring device 120 by finding the laser beam line in the real workspace and moving a target obstruction along the line until a radial alignment cue is indicated in the virtual CAD workspace in step 635.

Figure 7:
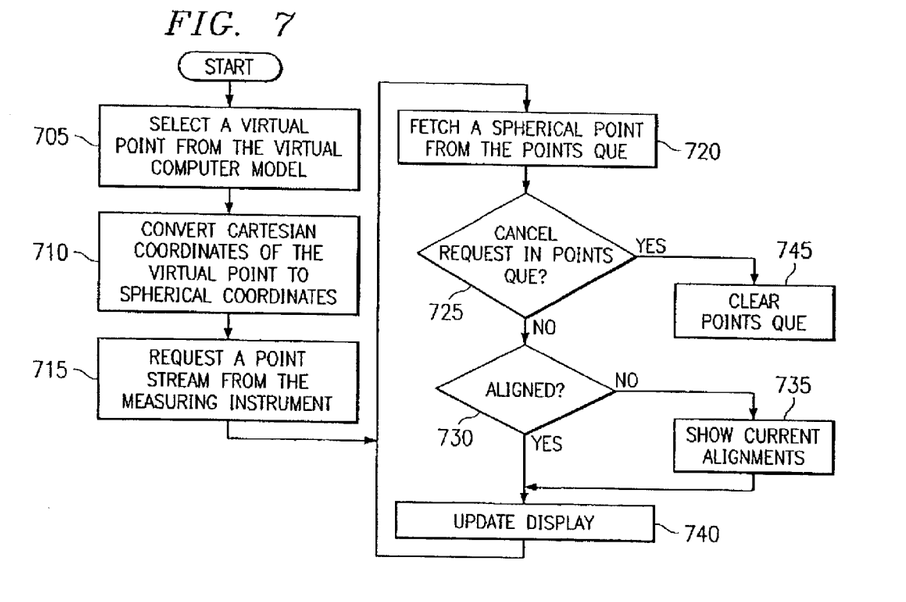
FIG. 7 shows a block diagram of the mapping computer program.

FIG. 7 shows a block diagram of the steps performed by the mapping computer program 115 which maps and translates desired virtual points from the virtual CAD workspace to a corresponding point in the real workspace. The mapping computer program 115 first prompts the user to select a virtual point from the virtual computer model in step 705. Next, the mapping computer program 115 converts the Cartesian coordinates of the virtual point selected to spherical coordinates in step 710. In step 715, a point stream is requested from the measuring device located in the real workspace. Alternately, the program may loop prompting the measuring device for a series of single points. Spherical coordinates of a point in the real workspace are then serially fetched from a point que in step 720. In step 725, the mapping computer program 115 asks the user whether to cancel the points que request. If the user decides to cancel the points que request, then the points que is cleared in step 745. If the user decides to not cancel the points que request, the mapping computer program 115 determines if alignment has been reached in step 730. If alignment has been reached, then the computer display is updated in step 740 and the mapping computer program 115 resumes at step 720. If alignment has not been reached, the mapping computer shows the current alignments in step 735, updates the display in step 740 and returns or loops to step 720.

Figure 8:
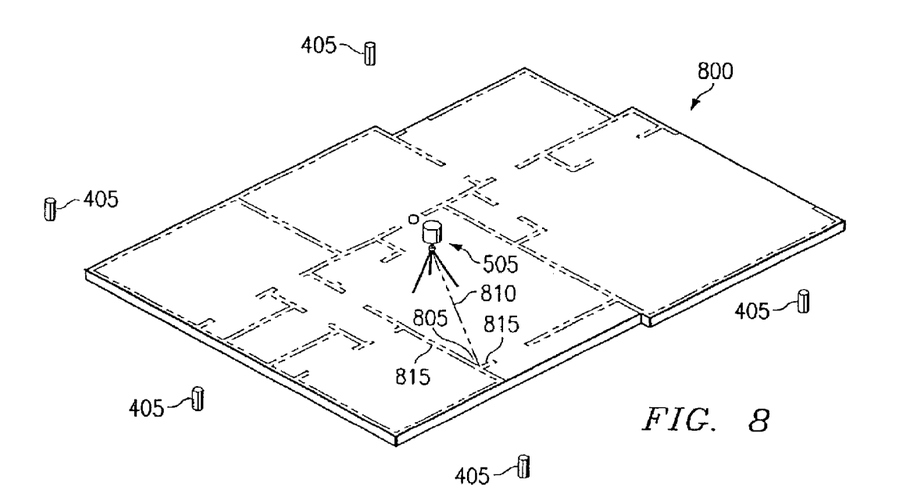
FIG. 8 shows a diagram of the measuring device aligning on a point p located at the corner of two virtual walls fixed on a virtual computer model of concrete slab in the virtual CAD workspace.

FIG. 8 shows a diagram of the measuring device aligning on a virtual point 805 located at the corner of two virtual walls 815 fixed on a virtual computer model of a floor plan for, in this particular example, a house 800. In fact, any two or three-dimensional structure or assembly modeled in CAD may be addressed. In FIG. 8, an icon or other recognizable object represents the virtual measuring device 505. The line extending from the virtual measuring device 505 is drawn by the application to represent the laser marker emanating from the real measuring device 120. The marker line is redrawn for each point acquired. The purpose of the marker line is to align the measuring device on desired points. As the user moves the measuring device 120 in the real workspace, the mapping computer program 115 continuously receives coordinate position data from the measuring device 120 to update the location of the virtual laser marker 810 in the virtual CAD workspace. Once the virtual laser marker 810 is aligned on the desired virtual point 805, the mapping computer program 115 signals the user to stop. To layout the entire floor plan 800, the user will select points in the virtual CAD space, move the virtual laser marker 800, and align on points on the virtual computer model and mark the corresponding points in real space.

With this technique, there is no manual layout or calculations required to locate points from the CAD drawing to the real space. The user is mapping directly from the virtual CAD workspace environment to the real workspace in the field in real-time. If a measuring device, such as the one claimed in U.S. Pat. No. 5,337,149 is used, the only real restriction is that the real workspace surface cannot be reflective and the angle of incidence on the final target point cannot be too great. A wet concrete slab would be an example of a reflective surface.

In FIG. 8, we presumed the special case of locating points with the physical surface of a slab as the target of the measuring device's marker laser. In the general case, there may or may not be a preexisting surface with which to work. In the un-constructed real workspace, however, there is often no surface with which to work and orient the user to the current proximity of the marker to the alignment target when viewed in the virtual CAD workspace. There are situations where a user may want to map a virtual point located on a scaled virtual computer model to the unbuilt real workspace. A few instances where this need arises include a plumber that needs to locate a drain invert in a trench at a particular point in the middle of a room, a fire protection installer who wants to hang a sprinkler head at a specific point in a ceiling, or an ironworker who needs to locate concrete inserts that will align with a piece of equipment that will eventually be installed below a certain point. The number of tasks is large.

In the virtual CAD workspace, an imaginary surface can be created at any point and at any attitude. In this case, a plane may be created passing through the virtual point in the virtual CAD workspace. The default location of this virtual reflection is at the zero datum of the CAD database. With this plane, the user sees both the point at which the measuring laser beam falls on a physical object and the point at which it passes through the virtual plane. A diagram depicting the procedure for locating virtual points projected to a plane surface in the line of sight of the virtual measuring device in the virtual CAD workspace is shown in FIG. 9.

Figure 9A:
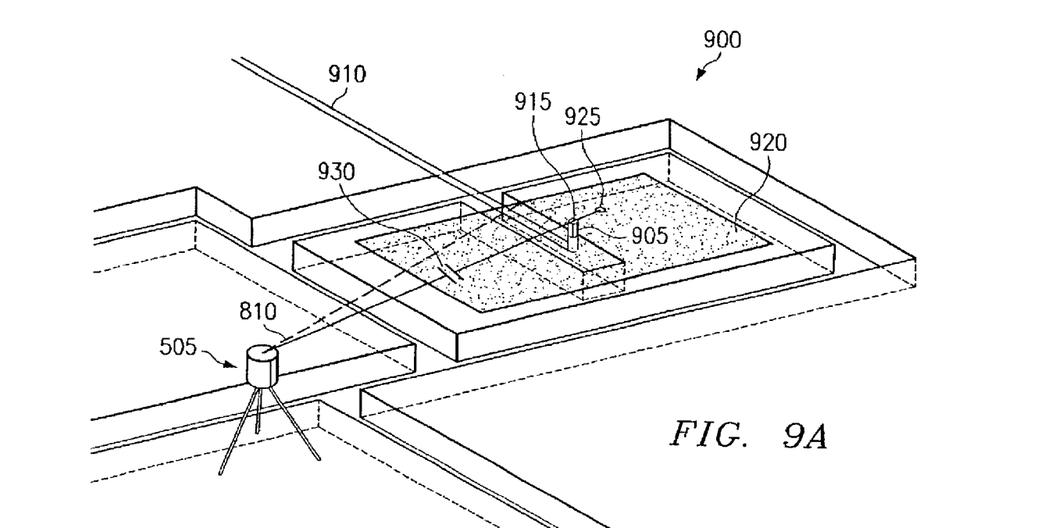
FIG. 9A shows a first diagram illustrating how to locate points projected to a plane surface in the line of sight of the virtual measuring device in the virtual CAD workspace.
Figure 9B:
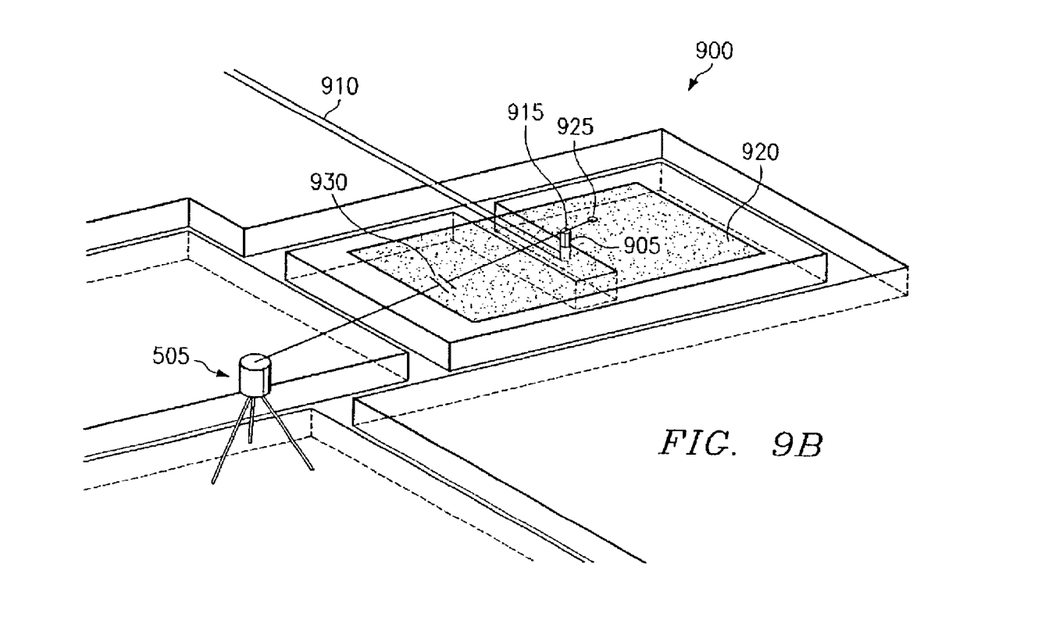
FIG. 9B shows a second diagram illustrating how to locate points projected to a plane surface in the line of sight of the virtual measuring device in the virtual CAD workspace.

FIGS. 9A and 9B show the structural and utility trench work on a typical construction site 900 with the same floor plan as in FIG. 7. The walls and other element of the as yet un-constructed, virtual slab are shown dashed. The goal here is to locate the hub 905, of a floor drain 910, to be cast into a concrete slab. Prior to casting the concrete slab, the location and height of the drainpipes must be accurately located within the real workspace. Conventionally, a plumber would locate the drain in the real workspace by computing and measuring off formwork or other fixed objects he or she can identify. Measuring an offset from a conventional or laser level at some elevation above a local benchmark can determine the elevation of the drain. Each measurement using the conventional method requires a separate operation.

The method for locating the hub 905 of a floor drain 910, to be cast into a concrete slab according to this invention is shown in FIGS. 9A and 9B. The object is to select a virtual point 915 on hub 905 in the virtual CAD workspace and then map and translate it to the real workspace. As shown in FIG. 9A, the user first selects the virtual point 915 in the virtual computer model. Next, a virtual plane 920 is constructed through the virtual point 915. The virtual plane 920 is shown here as a bounded rectangle with a dotted hatching for the sake of illustration. In reality, the plane would be infinite in the virtual space. The user can visualize the plane as a sheet of glass through which the laser beam passes. A virtual temporary marker line 925 is then drawn from the virtual measuring device 505 to the virtual point 915 on the virtual computer model. The purpose of the virtual plane 920 and the virtual marker line 925 are to orient and aid the user in locating the point in three-dimensional space.

As shown in FIG. 9B, the user now may manipulate the virtual laser line 810 by moving the measuring device 120 in the real workspace. Next, locate the virtual point of intersection between the virtual laser marker 810 and the virtual plane 920. This gives the user a visual cue as to his or her current alignment proximity. The point of intersection in the real workspace can only be located when the virtual laser marker 810 is perfectly coaxial and the laser marker emanating from the measuring device 120 in the real workspace falls on an object at the correct radial distance from the measuring device's 120 origin. In actual execution, the user may allow some small tolerance.

To aid the alignment, the user can bring the actual laser marker close to alignment on the virtual plane 920 and then seek angular alignment on both the pitch 190 and the yaw 195 axes. As the virtual laser marker 810 aligns within tolerance on an axis, an icon, such as the double hash mark 930, of the virtual laser marker 810 in the virtual CAD workspace will indicate that no further movement is required in that dimension. The double hash mark icon 930 shown here as two horizontal lines across virtual laser marker 810, represents vertical angular alignment. The user then can lock the axis and begin aligning the other axes.

Finally, radial alignment must be achieved. Radial alignment entails placing a movable target in the line of the laser marker's beam in the real workspace and moving it until the measuring device 120 reports the correct distance to the desired point. The movable target can be any dry, non-reflective surface such as a paddle with a cooperative surface, one's thumb, boot, or a point on a tape measure. In the interest of safety, the person locating the laser should not look directly at the measuring device's 120 laser without eye protection. Once the desired point is thus located, the user will establish a temporary point in space using any means such as a stake or string line or other repositionable physical marker or device.

Figure 10:
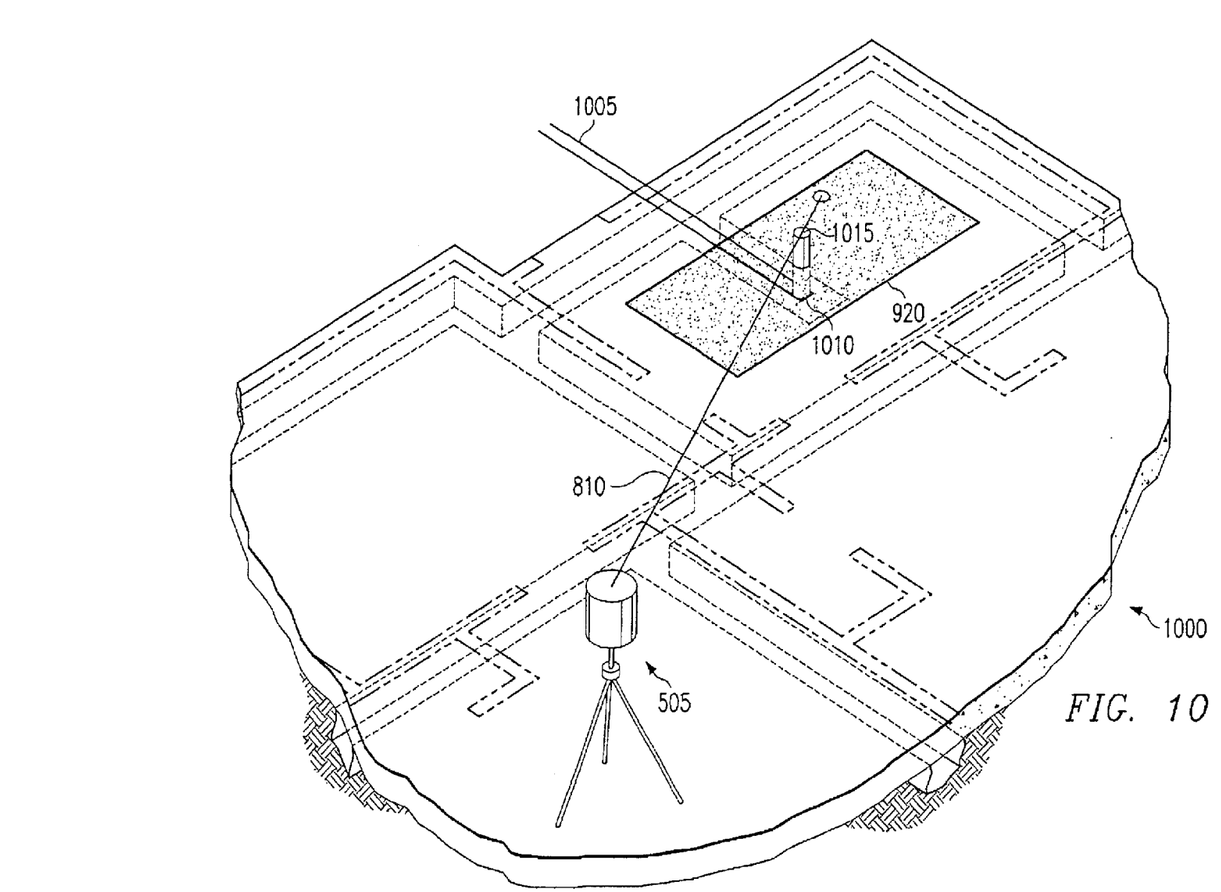
FIG. 10 shows a diagram showing how to locate a desired virtual point with an occluded view from the virtual measuring device.

There are times when a user may want to locate a point that cannot be sighted directly from the position of the measuring device. This procedure is illustrated in FIG. 10. FIG. 10 shows the excavations 1000 which might be required to cast a foundation slab. In this example, the pipe 1005 is shown laying in a trench that obscures the virtual point 1010 to the virtual measuring device's 505 line of sight in the virtual CAD workspace. The desired pipe invert elevation 1010 near the pipe's elbow is at a distance below the virtual finished floor.

In this particular example, the object is to locate a virtual point 1015 directly above the desired virtual point 1010. The user moves the virtual laser marker 810 across the surface of the virtual plane 920 to the virtual point 1015 by manipulating the physical measuring device as explained before in FIG. 9. Once located, the constructor may, in this case, drop a plumb line the distance from virtual point 1015 to the desired virtual point 1010. This example uses a vertical relation between the desired virtual point and the virtual point. One could also use a horizontal or any other reproducible relationship to the virtual surface.

In summary, the present invention provides a system and method for real-time mapping and transfer of coordinate position data from a virtual CAD workspace to the real workspace comprises a computer containing a memory and a processor for storing and executing a mapping computer program. The mapping computer program receives coordinate position data, prompts a user to locate desired virtual points on the virtual computer model displayed on a computer display and map them to a corresponding point in the real workspace.

Although the present invention has been described in detail, it should be understood that various changes, substitutions and alterations can be made hereto without departing from the spirit and scope of the invention as described by the appended claims.

What is claimed is:

1. A system for real-time mapping and transfer of coordinate position data from a virtual CAD workspace to a real workspace comprising:
   a computer operable to access a mapping computer program, said computer comprising:
      a memory operable to store said mapping computer program;
      a processor electrically connected to said memory, said processor operable to execute said mapping computer program such that said computer is directed by said mapping computer program to:
receive coordinate position data;
prompt a user to select a plurality of desired virtual points in said virtual CAD workspace;
locate said plurality of desired virtual points in said virtual CAD workspace; and
map and translate said plurality of desired virtual points in said virtual CAD workspace to corresponding points in said real work space;
a measuring device operable to locate the corresponding points in the real work space; and
a computer display operable to display said virtual CAD workspace.

2. The system of claim 1, wherein said computer is further operable to access a CAD computer program and store said CAD computer program in said memory.

3. The system of claim 2, wherein said processor is further operable to execute said CAD computer program such that said computer is directed by said CAD computer program to:
allow said user to create and/or view an accurately drawn and scaled virtual computer model of a desired structure in said virtual CAD workspace and store it in said memory;
allow said user to create said plurality of virtual stakeout points or other such layout points around or within the perimeter of said virtual computer model; and
allow said user to select said plurality of desired virtual points in said virtual CAD workspace.

4. The system of claim 3, wherein said computer display is further operable to display a visual image of said virtual computer model.

5. The system of claim 1, wherein said mapping computer program directs said computer to receive coordinate position data directly from said measuring device, said measuring device operable to measure and transmit coordinate position data of points from said real workspace to said virtual CAD workspace, said measuring device further operable to receive coordinate position data of desired virtual points from said virtual CAD workspace and locate said coordinate position data in said real workspace.

6. The system of claim 1, wherein said mapping computer program directs said computer to receive coordinate position data directly from a CAD database.

7. The system of claim 1, wherein a microcontroller electrically connects said computer to said measuring device, said microcontroller further operable to transmit data between said computer and said measuring device.

8. The system of claim 1, wherein said microcontroller connects said computer to said measuring device through a wireless link.

9. The system of claim 1, wherein said measuring device comprises:
an electronic distance measuring device (EDM) operable to measure the distance from said measuring device to a desired point in said real workspace;
a first rotational sensor operable to monitor and measure the rotary attitude of said EDM about the pitch axis; and
a second rotational sensor operable to monitor and measure the rotary attitude of said EDM about the yaw axis.

10. The system of claim 1, wherein said desired virtual points chosen in said virtual CAD workspace may be in two or three dimensional space.

11. The system of claim 1, wherein said mapping computer program maps and translates said desired virtual points in said virtual CAD workspace to corresponding points in said real work space comprising the steps of:
converting the Cartesian coordinates of said desired virtual points to spherical coordinates;
requesting a point stream from said measuring device;
fetching a spherical point from a spherical points que;
prompting said user whether or not to cancel said spherical points que request;
if said user decides not to cancel said spherical points request que then:
comparing said spherical point from said spherical points que with said spherical coordinates of said desired virtual point to determine if they align;
if said spherical point and said desired virtual point do not align:
show current alignments;
update said computer display; and
fetch another spherical point from said spherical points que;
if said spherical point and said desired virtual point do align:
update said computer display;
if said user decides to cancel said spherical points request que then:
clear said spherical points que.

12. The system of claim 1, wherein said measuring device is further operable to measure and transmit coordinate position data of points from said real workspace to said virtual CAD workspace.

13. The system of claim 1, further comprising an input device operable to input data into said computer and to control said computer.

14. The system of claim 1, further comprising a first battery operable to power said computer and a second battery operable to power said microcontroller.

15. The system of claim 1, further comprising
an input device operable to input data into said computer and control said computer.

16. A system for real-time mapping and transfer of coordinate position data from a virtual CAD workspace to a real workspace comprising:
a measuring device operable to measure and transmit coordinate position data of points from said real workspace to said virtual CAD workspace, said measuring device further operable to receive coordinate position data of desired virtual points from said virtual CAD workspace and locate said coordinate position data in said real workspace;
a computer operable to access a CAD computer program and a mapping computer program, said computer comprising:
a memory operable to store said CAD computer program and said mapping computer program;
a processor electrically connected to said memory, said processor operable to execute said CAD computer program such that said computer is directed by said CAD computer program to:
allow a user to create and/or view an accurately drawn and scaled virtual computer model of a desired structure in said virtual CAD workspace and store it in said memory;
allow a user to create a plurality of virtual stakeout points around or within the perimeter of said virtual computer model; and
allow said user to select said plurality of desired virtual points in said virtual CAD workspace;

said processor further operable to execute said mapping computer program such that said computer is directed by said mapping computer program to:
  receive coordinate position data from said measuring device;
  prompt a user to select a plurality of desired virtual points in said virtual CAD workspace;
  locate a plurality of said desired virtual points in said virtual CAD workspace; and
  map and translate said desired plurality of virtual points in said virtual CAD workspace to corresponding points in said real work space;
a first battery operable to power said computer;
a computer display operable to display a visual image of said virtual computer model or said virtual CAD workspace;
an input device operable to input data into said computer and control said computer;
a microcontroller operable to electrically connect said computer to said measuring device, said microcontroller further operable to transmit data between said computer and said measuring device; and
a second battery operable to power said microcontroller.

17. A system comprising a computer program stored in computer-readable form on a tangible storage medium for real-time mapping and transfer of coordinate position data from a virtual CAD workspace to a real workspace, said computer program executable by a processor to:
  receive coordinate position data;
  prompt a user to select a plurality of desired virtual points in said virtual CAD workspace;
  locate said plurality of desired virtual points in said virtual CAD workspace; and
  map and translate said plurality of desired virtual points in said virtual CAD workspace to corresponding points in said real work space.

18. A method for real-time mapping and transfer of coordinate position data from a virtual CAD workspace to a real workspace comprising the steps of:
  at said real workspace:
    establishing a stationary reference frame for a measuring device within said real workspace;
  at said computer:
    loading said virtual computer model of said structure into said virtual CAD workspace; and
    accessing a mapping computer program stored in said memory of said computer wherein said mapping computer program is executable by said computer to:
      map and translate said stationary reference frame from said real workspace to said virtual CAD workspace;
      receive coordinate position data;
      locate the position of a plurality of desired virtual points in said virtual CAD workspace; and
      map and translate said plurality of virtual points in said virtual CAD workspace to corresponding points in said real workspace.

19. The method of claim 18, further comprising the steps of:
  at a computer:
    accessing a CAD computer program stored in a memory of said computer wherein said CAD computer program may be used to create and/or view a virtual computer model of a desired structure in said virtual CAD workspace;
    creating a plurality of virtual stakeout points around or within the perimeter of said virtual computer model;
    storing said virtual computer model of said desired structure in said memory; and
    allowing a user to select a plurality of desired virtual points in said virtual CAD workspace.

20. The method of claim 18, wherein said measuring device comprises:
  an electronic distance measuring device (EDM) operable to measure the distance from said measuring device to a desired point in said real workspace;
  a first rotational sensor operable to monitor and measure the rotary attitude of said EDM about the pitch axis; and
  a second rotational sensor operable to monitor and measure the rotary attitude of said EDM about the yaw axis.

21. The method of claim 18, wherein said stationary reference frame in said real workspace is established using conventional surveying techniques or previous layout points.

22. The system of claim 18, wherein said desired virtual point chosen in said virtual CAD workspace may be in two or three dimensional space.

23. The method of claim 22, wherein locating said position of any desired virtual point in said two dimensional virtual CAD workspace comprises the steps of:
  initiating a virtual point selection routine;
  aligning said virtual laser marker on said desired virtual point in said virtual CAD workspace; and
  signaling with an alignment signal once said virtual laser marker is aligned on said desired virtual point, wherein said alignment signal may be a target icon or other visual, audible, or sensory cues.

24. The method of claim 22, wherein locating said position of any desired virtual point in said three dimensional virtual CAD workspace comprises the steps of:
  initiating a virtual point selection routine;
  establishing a virtual datum plane passing through said desired virtual point at some predefined attitude with respect to said virtual measuring device;
  selecting said desired virtual point in said virtual CAD workspace;
  drawing a virtual laser marker from said virtual measuring device through said desired virtual point in said virtual CAD workspace;
  aligning a virtual laser beam emanating from said virtual measuring device so it falls on said desired virtual point where said virtual datum plane and said virtual laser marker intersect; and
  signaling once alignment said virtual laser marker is aligned on said desired virtual point, wherein said alignment signal may be a target icon or other sensory cue.

25. The method of claim 22, wherein said mapping computer program maps and translates said virtual points in said virtual CAD workspace to corresponding points in said real work space by:
  converting the Cartesian coordinates of said desired virtual points to spherical coordinates;
  requesting a point stream from said measuring device;
  fetching a spherical point from a spherical points que;
  prompting said user whether or not to cancel said spherical points que request;
  if said user decides not to cancel said spherical points request que then:
    comparing said spherical point from said spherical points que with said spherical coordinates of said desired virtual point to determine if they align;

if said spherical point and said desired virtual point do not align:
  show current alignments;
  update said computer display; and
  fetch another spherical point from said spherical points que;
if said spherical point and said desired virtual point do align:
  update said computer display;
if said user decides to cancel said spherical points request que then:
  clear said spherical points que.

26. A method for real-time mapping and transfer of coordinate position data from a virtual CAD workspace to a real workspace comprising the steps of:
at a computer:
  accessing a CAD computer program stored in a memory of said computer wherein said CAD computer program may be used to create and/or view a virtual computer model of a desired structure in said virtual CAD workspace;
  creating a plurality of virtual stakeout points around or within the perimeter of said virtual computer model; and
  storing said virtual computer model of said desired structure in said memory;
at said real workspace:
  establishing a stationary reference frame for a measuring device within said real workspace;
at said computer:
  loading said virtual computer model of said structure into said virtual CAD workspace; and
  accessing a mapping computer program stored in said memory of said computer wherein said mapping computer program is executable by said computer to:
  map and translate said stationary reference frame from said real workspace to said virtual CAD workspace;
  select a plurality of desired virtual points in said virtual CAD workspace;
  locate the position of said plurality of desired virtual points in said virtual CAD workspace; and
  map and translate said virtual points in said virtual CAD workspace to corresponding points in said real workspace.

27. A method for real-time mapping and transfer of coordinate position data from a virtual CAD workspace to a real workspace comprising the steps of:
  creating a scaled virtual computer model of a desired structure in a virtual CAD workspace;
  creating a plurality of virtual stakeout points around or within the perimeter of said virtual computer model;
  storing said virtual computer model of said desired structure in said memory;
  establishing a stationary reference frame for a measuring device within said real workspace;
  mapping and translating said stationary reference frame of said measuring device within said real workspace to said virtual CAD workspace;
  loading said virtual computer model of said structure into said virtual CAD workspace;
  selecting a plurality of desired virtual points in said virtual CAD workspace;
  locating the position of said plurality of desired virtual points in said virtual CAD workspace; and
  mapping and translating said plurality of desired virtual points in said virtual CAD workspace to corresponding points in said real work space.

28. The method of claim 27, wherein said stationary reference frame in said real workspace is established using conventional surveying techniques or previous layout points, further wherein said stationary reference frame in said real workspace is mapped and translated to said virtual CAD workspace, said measuring device represented in said virtual CAD workspace by a virtual measuring device icon.

29. The method of claim 27, wherein said plurality of desired virtual points chosen in said virtual CAD workspace may be in two or three dimensional space.

30. The method of claim 29 wherein locating said position of any desired virtual point in said two dimensional virtual CAD workspace comprises the steps of:
  initiating a virtual point selection routine;
  aligning said virtual laser marker on said desired virtual point in said virtual CAD workspace; and
  signaling with an alignment signal once said virtual laser marker is aligned on said desired virtual point, wherein said alignment signal may be a target icon or other sensory cues.

31. The method of claim 29, wherein locating said position of any desired virtual point in said three dimensional virtual CAD workspace comprises the steps of:
  initiating a virtual point selection routine;
  establishing a virtual datum plane passing through said desired virtual point at some predefined attitude with respect to said virtual measuring device;
  selecting said desired virtual point in said virtual CAD workspace;
  drawing a virtual laser marker from said virtual measuring device through said desired virtual point in said virtual CAD workspace;
  aligning a virtual laser beam emanating from said virtual measuring device so it falls on said desired virtual point where said datum plane and said virtual laser marker intersect; and
  signaling with an alignment signal once said virtual laser marker is aligned on said desired virtual point, wherein said alignment signal may be a target icon or other sensory cues.

32. The method of claim 27, wherein mapping and translating said virtual points in said virtual CAD workspace to corresponding points in said real workspace comprise the steps of:
  locating said laser marker emanating from an electronic distance measuring machine (EDM) located on said measuring device in said real workspace;
  moving a locator target along said EDM's laser marker in said real workspace;
  monitoring the movement of said locator target along said EDM's laser marker by observing its position in said virtual CAD workspace; and
  signaling that alignment has been achieved once said virtual laser beam emanating from said virtual measuring device falls on any of said desired virtual points.

33. The method of claim 27, wherein said virtual computer model is created on a computer using a CAD machine or any other computer application at any location producing a compatible file format.

34. The method of claim 27, wherein said stationary reference frame may be an origin or an initial reference for angles on the pitch and yaw axes.

35. The method of claim 30, wherein said virtual laser marker from said virtual measuring device may be aligned with said desired virtual point by manually moving said measuring device in said real workspace until alignment is achieved.

36. The method of claim 30, wherein said virtual laser marker from said virtual measuring device may be aligned with said desired virtual point by using electronically controlled servo motors to move said measuring device in said real workspace until alignment is achieved.

37. The method of claim 31, wherein said virtual laser marker from said virtual measuring device may be aligned with said desired virtual point by manually moving said measuring device in said real workspace until alignment is achieved.

38. The method of claim 31, wherein said virtual laser marker from said virtual measuring device may be aligned with said desired virtual point by using electronically controlled servo motors to move said measuring device in said real workspace until alignment is achieved.

39. A method for real-time mapping and transfer of coordinate position data from a virtual CAD workspace to a real workspace comprising the steps of:

establishing a stationary reference frame for a measuring device within a real workspace;

loading a virtual computer model into said virtual CAD workspace;

mapping and translating said stationary reference frame from said real workspace to said virtual CAD workspace;

receiving coordinate position data;

locating the position of a plurality of desired virtual points in said virtual CAD workspace; and mapping and translating said plurality of virtual points in said virtual CAD workspace to corresponding points in said real workspace.

* * * * *